(12) United States Patent
Nelson

(10) Patent No.: US 12,222,030 B1
(45) Date of Patent: Feb. 11, 2025

(54) ELECTRIC DRIVE UNIT

(71) Applicant: Schaeffler Technologies AG & Co. KG, Herzogenaurach (DE)

(72) Inventor: Kyle Nelson, Delaware, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/605,118

(22) Filed: Mar. 14, 2024

(51) Int. Cl.
*F16H 57/04* (2010.01)
*F16H 57/021* (2012.01)
*F16H 57/02* (2012.01)

(52) U.S. Cl.
CPC ....... *F16H 57/0423* (2013.01); *F16H 57/021* (2013.01); *F16H 57/0415* (2013.01); *F16H 57/0424* (2013.01); *F16H 57/0486* (2013.01); *F16H 2057/02034* (2013.01); *F16H 2057/02052* (2013.01)

(58) Field of Classification Search
CPC ............ F16H 57/0423; F16H 57/021; F16H 57/0415; F16H 57/0424; F16H 57/0486; F16H 2057/02034; F16H 2057/02052
See application file for complete search history.

(56) References Cited

U.S. PATENT DOCUMENTS

| 9,641,039 | B2 * | 5/2017 | Smetana | F16C 35/06 |
| 2010/0320849 | A1 * | 12/2010 | Wilton | F16H 37/082 |
| | | | | 74/421 A |
| 2015/0068824 | A1 * | 3/2015 | Matsuura | B60K 17/105 |
| | | | | 180/53.4 |
| 2018/0076687 | A1 * | 3/2018 | Pritchard | H02K 11/33 |
| 2021/0394600 | A1 * | 12/2021 | Absenger | H02K 7/116 |
| 2022/0037954 | A1 * | 2/2022 | Downs | H01L 23/49568 |
| 2023/0258250 | A1 * | 8/2023 | Inoue | F16H 57/037 |
| | | | | 475/150 |
| 2023/0387755 | A1 | 11/2023 | Nelson et al. | |
| 2024/0247713 | A1 * | 7/2024 | Kosaka | F16H 57/0424 |
| 2024/0288062 | A1 * | 8/2024 | Uehara | F16H 57/0412 |

* cited by examiner

*Primary Examiner* — Jacob S. Scott
*Assistant Examiner* — Farhana Pervin
(74) *Attorney, Agent, or Firm* — Price Heneveld LLP

(57) ABSTRACT

An electric drive unit includes: a motor that rotates a rotor shaft; a housing with a bearing shield extending between motor housing and gearbox regions, the bearing shield having a first side that faces toward the motor housing region and a second side that partially defines the gearbox region and along which a channel extends; a planetary gearset including a sun gear, planet gears, and a carrier; and a wiper coupled to the housing proximate to the channel and abutting the carrier, such that fluid is wiped off of the carrier by the wiper as the carrier rotates and flows to the channel therefrom.

20 Claims, 6 Drawing Sheets

ELECTRIC DRIVE UNIT

FIELD OF THE DISCLOSURE

The present disclosure generally relates to electric drive units for vehicles. More specifically, the present disclosure relates to an electric drive unit that includes a housing having a channel extending therealong and a wiper configured to wipe fluid off of a planetary gearset carrier into the channel.

BACKGROUND OF THE DISCLOSURE

Electric drive units often include gearboxes that serve as oil reservoirs. Oil is often splashed within these gearboxes by gears and other moving components to lubricate and cool various components of the electric drive unit.

SUMMARY OF THE DISCLOSURE

According to a first aspect of the present disclosure, an electric drive unit includes a motor that drives rotation of a rotor shaft, and a housing that includes a bearing shield that extends between a motor housing region that houses the motor and a gearbox region. The bearing shield has a first side that faces toward the motor housing region and a second side opposite the first side that partially defines the gearbox region and along which a channel extends. The electric drive unit also includes a planetary gearset disposed within the gearbox region and including a sun gear operably coupled with the rotor shaft such that the sun gear and the rotor shaft are configured to rotate together at a common rate of rotation about an axis, a plurality of planet gears that interface with the sun gear and are configured to revolve around the axis, and a carrier that is operably coupled with the plurality of planet gears, such that revolution of the planet gears rotates the carrier about the axis. The electric drive unit further includes a wiper coupled to the housing proximate to the channel and configured to abut the carrier, such that fluid is wiped off of the carrier by the wiper as the carrier rotates and flows to the channel therefrom.

Embodiments of the first aspect of the disclosure can include any one or a combination of the following features:
 the channel is formed wholly by the housing;
 the second side of the bearing shield includes a cleft that at least partially forms the channel;
 the cleft is wholly elevationally upward of the axis;
 a stator carrier that cooperates with the first side of the bearing shield to define a fluid jacket, wherein the fluid jacket is radially and circumferentially aligned with at least a portion of the channel, such that heat is transferred from the fluid within the channel into the fluid jacket through the bearing shield;
 the fluid within the channel is oil, and the fluid jacket contains water, and wherein heat is transferred from the oil to the water through the bearing shield; and
 the wiper is formed of a resilient material.

According to a second aspect of the present disclosure, an electric drive unit includes a motor that drives rotation of a rotor shaft, a housing that includes a bearing shield that extends between a motor housing region that houses the motor and a gearbox region, and a gearset disposed within the gearbox region and operably coupled with the rotor shaft, such that rotation of the rotor shaft causes the gearset to splash fluid that is within the gearbox region onto the second side of the bearing shield above the channel. The bearing shield has a first side that faces toward the motor housing region and a second side opposite the first side that partially defines the gearbox region and along which a channel extends. Further, gravity draws the fluid downward along the second side of the bearing shield and into the channel.

Embodiments of the second aspect of the disclosure can include any one or a combination of the following features:
 the second side of the bearing shield includes a cleft that at least partially forms the channel;
 the cleft is wholly elevationally upward of an axis about which the rotor shaft rotates;
 the gearset is a planetary gearset that includes a carrier;
 a wiper coupled to the housing and configured to wipe fluid off of the carrier as the carrier rotates;
 the wiper is coupled to the second side of the bearing shield proximate the channel, such that the fluid that the wiper wipes off of the carrier flows into the channel;
 the wiper is formed of a resilient material;
 a stator carrier that cooperates with the first side of the bearing shield to define a fluid jacket, wherein the fluid jacket is radially and circumferentially aligned with at least a portion of the channel with respect to an axis about which the rotor shaft rotates, such that heat is transferred from the fluid within the channel into the fluid jacket through the bearing shield; and
 the fluid within the channel is oil, and the fluid jacket contains water, and wherein heat is transferred from the oil to the water through the bearing shield.

According to a third aspect of the present disclosure, an electric drive unit includes a motor that drives rotation of a rotor shaft, a planetary gearset operably coupled with the rotor shaft and having a carrier, a housing that houses the motor and planetary gearset, and a wiper coupled to the housing and configured to wipe fluid off of the carrier as the carrier rotates.

Embodiments of the third aspect of the disclosure can include any one or a combination of the following features:
 the wiper is formed of a resilient material;
 the housing includes a bearing shield that extends between the motor and the planetary gearset and includes a channel that is configured to receive fluid wiped off of the carrier by the wiper; and
 the channel is a cleft in the bearing shield that is positioned wholly elevationally upward of an axis about which the rotor shaft rotates.

These and other features, advantages, and objects of the present disclosure will be further understood and appreciated by those skilled in the art by reference to the following specification, claims, and appended drawings.

Figure 1:
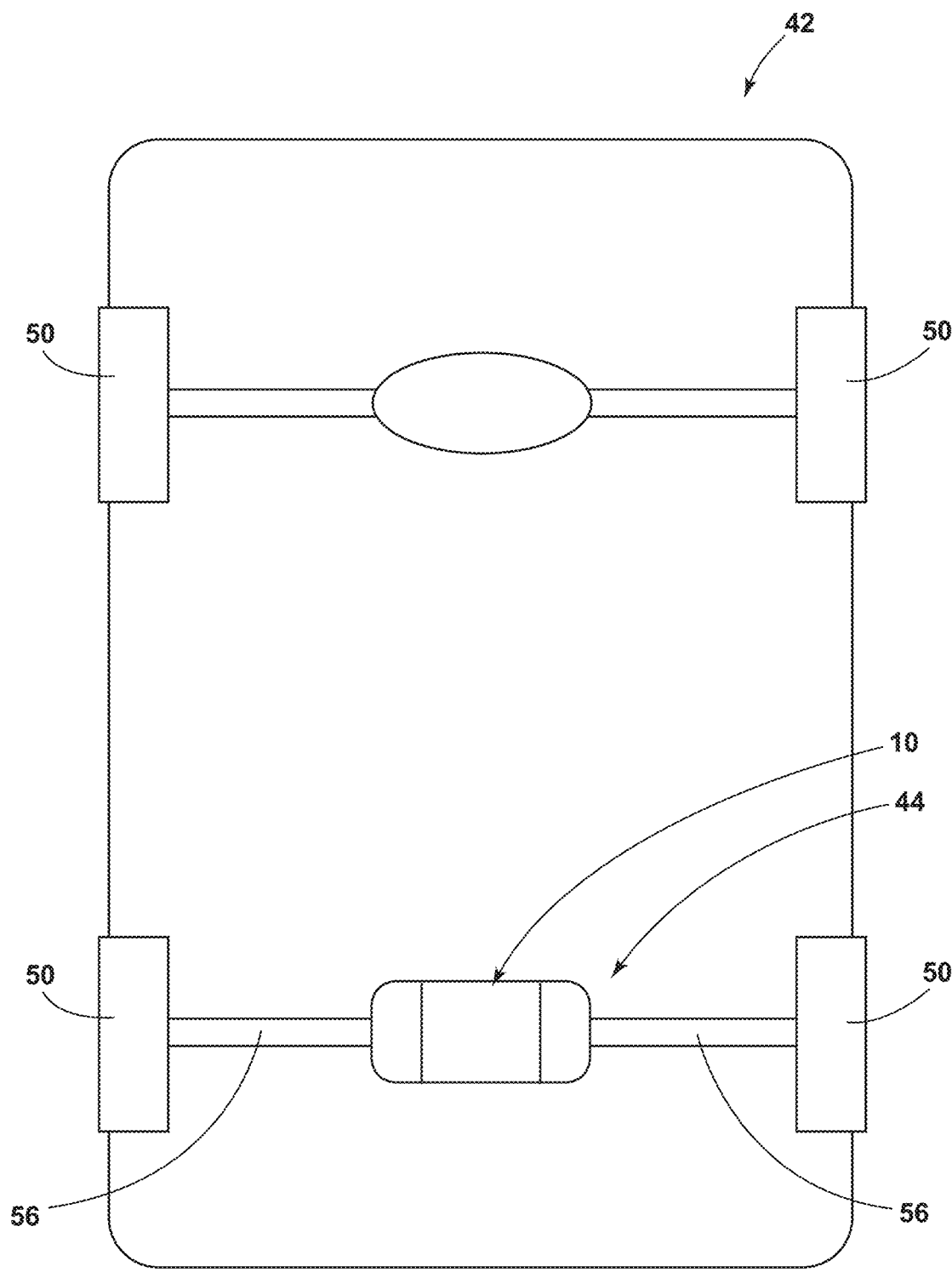
FIG. 1 is a schematic view of a vehicle that includes an electric drive unit, according to one embodiment.
Figure 2:
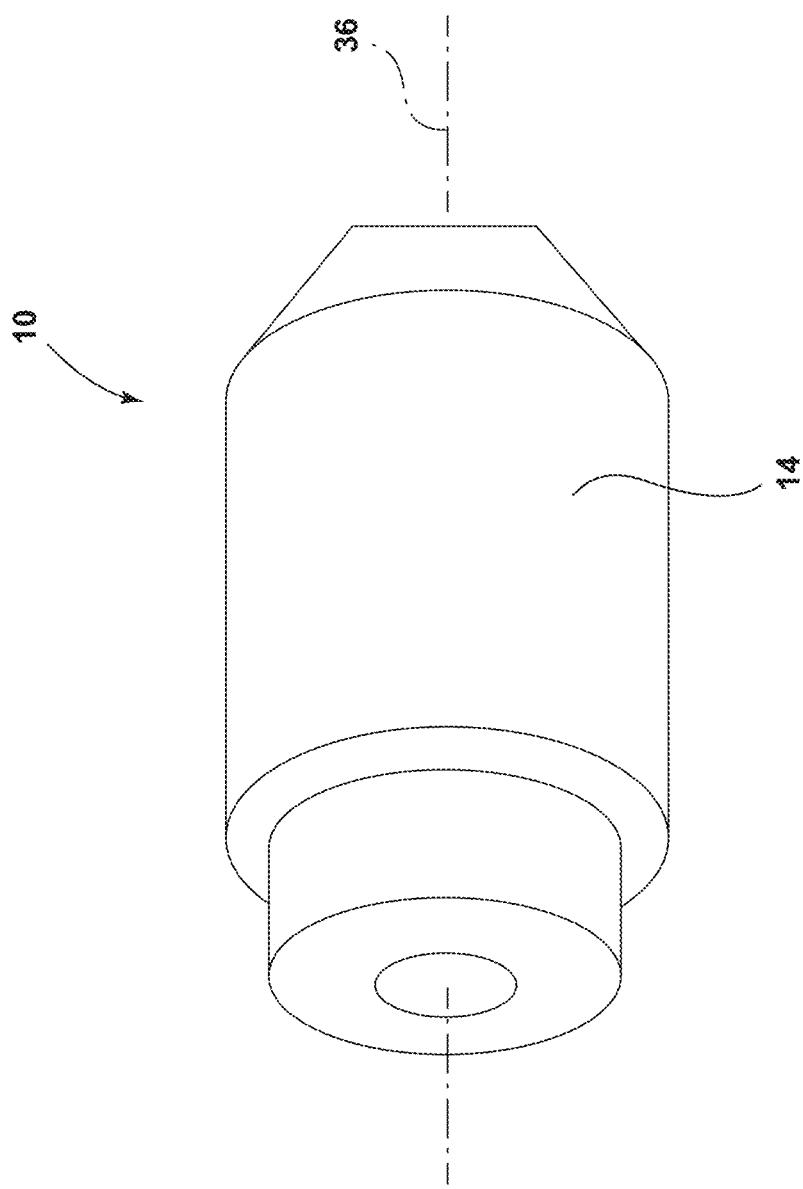
FIG. 2 is a perspective view of the electric drive unit, according to one embodiment.
Figure 3:
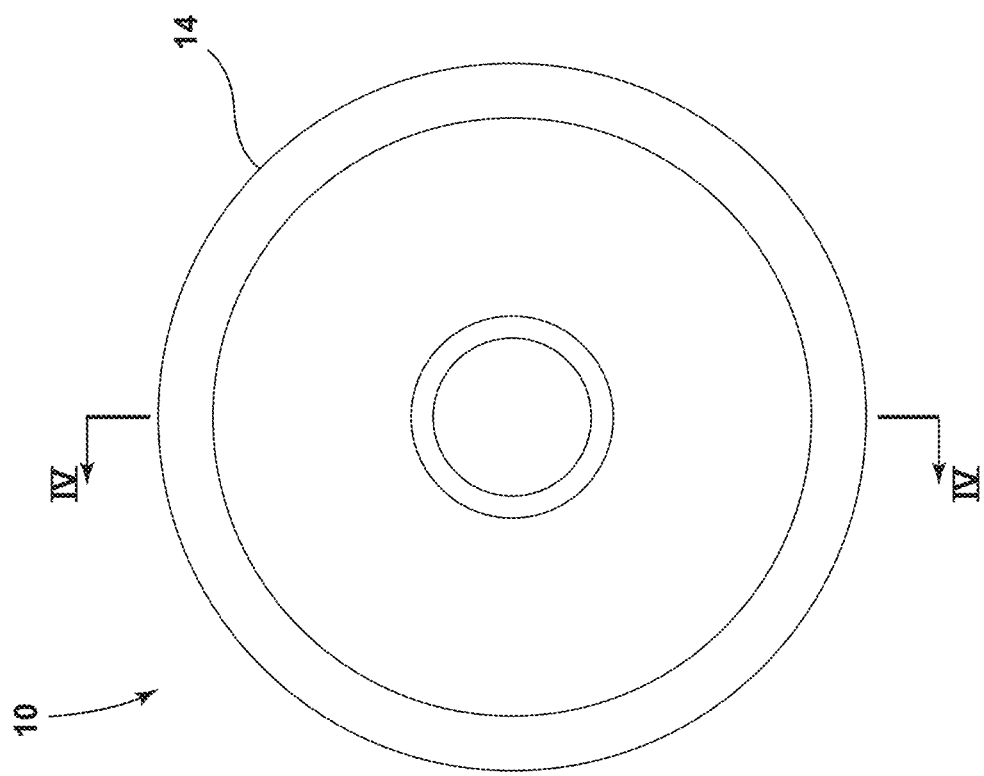
FIG. 3 is a side elevational view of the electric drive unit, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-6, an electric drive unit 10 includes an electric motor 12, a housing 14, a planetary gearset 16, and a wiper 18. The motor 12 is configured to drive rotation of a rotor shaft 20. The housing 14 includes a bearing shield 22 that extends between a motor housing region 26 that houses the motor 12 and a gearbox region 30. The bearing shield 22 includes a first side 24 that faces toward the motor housing region 26 and a second side 28 opposite the first side 24 that partially defines the gearbox region 30. A channel 32 extends along the second side 28 of the bearing shield 22. The planetary gearset 16 is disposed within the gearbox region 30. The planetary gearset 16 includes a sun gear 34 that is operably coupled with the rotor shaft 20 such that the sun gear 34 and the rotor shaft 20 are configured to rotate together at a common rate of rotation about an axis 36, a plurality of planet gears 38 that interface with the sun gear 34 and are configured to revolve around the axis 36, and a carrier 40 that is operably coupled with the plurality of planet gears 38, such that revolution of the planet gears 38 rotates the carrier 40 about the axis 36. The wiper 18 is coupled to the housing 14 proximate to the channel 32 and is configured to abut the carrier 40, such that fluid 58 is wiped off of the carrier 40 by the wiper 18 as the carrier 40 rotates and flows to the channel 32 therefrom.

Figure 4:
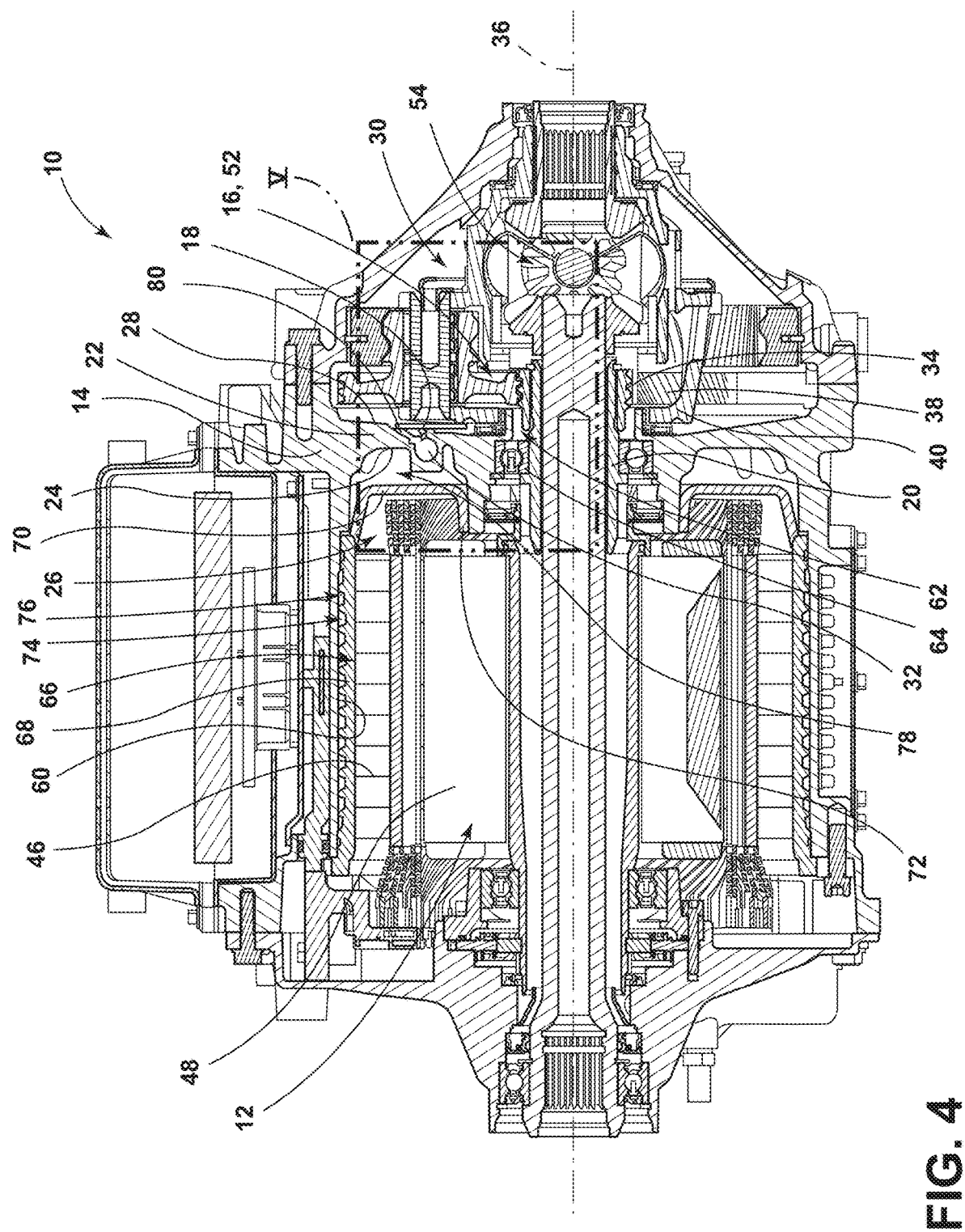
FIG. 4 is a cross-sectional view of the electric drive unit of FIG. 3 taken at line IV-IV, illustrating a bearing shield of a housing of the electric drive unit that includes a channel and a wiper coupled to the bearing shield configured to wipe a portion of a carrier of a planetary gearset, according to one embodiment.

Referring now to FIG. 1, a vehicle 42 is illustrated. The vehicle 42 may be an electric vehicle and/or a hybrid electric vehicle. In the embodiment illustrated in FIG. 1, the vehicle 42 includes the electric drive unit 10. As illustrated, the electric drive unit 10 is a portion of an electric axle assembly 44 of the vehicle 42. As illustrated in FIG. 4, the electric drive unit 10 includes the electric motor 12, which includes a stator 46 and a rotor 48 that is configured to drive rotation of the rotor shaft 20, in various embodiments. The rotor shaft 20 can be operably coupled with at least one wheel 50 of the vehicle 42, such that rotation of the rotor shaft 20 drives rotation of the at least one wheel 50 in operation of the electric drive unit 10. In various implementations, the electric drive unit 10 of the vehicle 42 includes a transmission. The transmission can include a gearset 52, such as a planetary gearset 16, as described further herein. Further, a differential 54 may be operably coupled with the gearset 52. The gearset 52 may be configured to interface with the rotor shaft 20 and the differential 54, as described further herein, and the differential 54 may be configured to interface with half shafts 56 of the vehicle 42 that are coupled with the wheels 50 of the vehicle 42. As such, rotation of the rotor shaft 20 by the electric motor 12 can drive rotation of the half shafts 56 and the attached wheels 50 of the vehicle 42 via the operable coupling of the half shafts 56 to the rotor shaft 20 by the gearset 52 and the differential 54.

Referring now to FIGS. 2-5, the electric drive unit 10 includes the housing 14. The housing 14 can be an assembly of a plurality of components, in some examples. For example, the housing 14 can be a die-cast aluminum housing that is formed of a plurality of components. The housing 14 can define a motor housing region 26 and a gearbox region 30. The motor 12 of the electric drive unit 10 can be housed within the motor housing region 26. The gearbox region 30 defined by the housing 14 can contain a plurality of electric drive unit components, such as the gearset 52 and the differential 54. Further, the gearbox region 30 may serve as a reservoir for fluid 58, such as oil, as described further herein. The housing 14 includes an outer wall 60 that extends generally circumferentially about the motor 12 of the electric drive unit 10. The housing 14 further includes the bearing shield 22. The bearing shield 22 extends radially inboard from the outer wall 60 and is arranged to generally separate the gearbox region 30 from the motor housing region 26.

Figure 5:
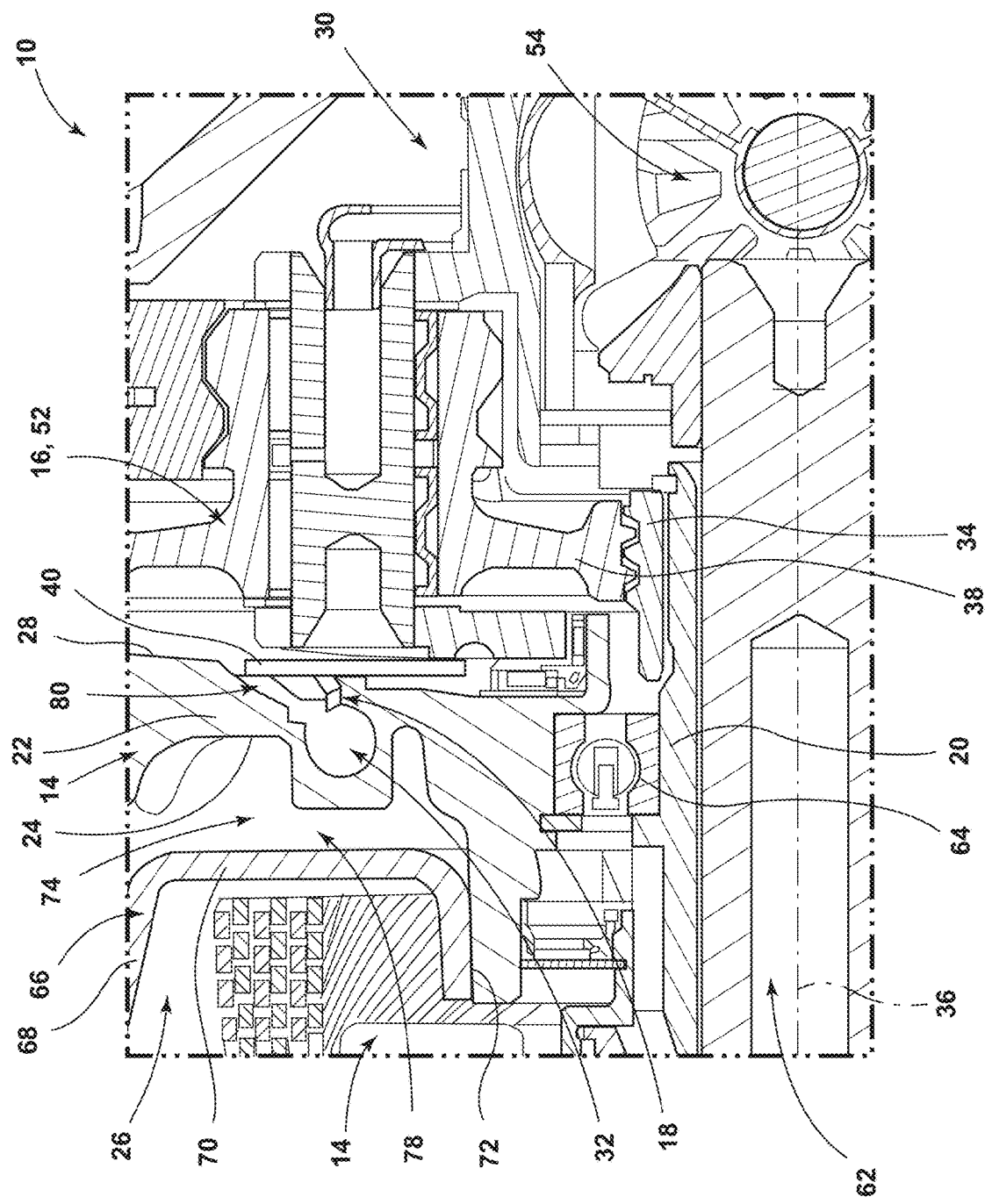
FIG. 5 is an enlarged view of area V of FIG. 4, illustrating the channel of the bearing shield of the housing, and the wiper coupled to the housing proximate the channel and in contact with a portion of the carrier to wipe fluid off of the carrier during operation of the electric drive unit.

As illustrated in FIG. 4, the bearing shield 22 can define a central aperture 62. The axis 36 about which the rotor shaft 20 of the motor 12 is configured to rotate may extend through the central aperture 62, in various embodiments. A bearing 64 can be positioned radially between the bearing shield 22 and the rotor shaft 20 of the electric motor 12, as illustrated in FIG. 4. The bearing 64 can support and facilitate rotation of the rotor shaft 20 about the axis 36. In some implementations, a dynamic seal (not shown) may be arranged between the bearing shield 22 and the rotor shaft 20 to prevent or restrict fluid 58, such as oil, from entering the motor housing region 26 from the gearbox region 30. As illustrated in FIGS. 4 and 5, the bearing shield 22 includes the first side 24 that faces toward the motor housing region 26 and the second side 28 that is opposite the first side 24 and that partially defines the gearbox region 30 of the housing 14.

Referring now to FIGS. 4 and 5, the electric drive unit 10 includes the motor 12. The motor 12 includes the stator 46 and the rotor 48 and is configured to drive rotation of the rotor shaft 20 about the axis 36. A variety of types of motors 12 are contemplated for use in the electric drive unit 10. For example, the motor 12 can be an induction motor. As illustrated in FIG. 4, the rotor shaft 20 is positioned radially inboard of the rotor 48 and the stator 46 and extends axially through the rotor 48 of the motor 12. Further, the stator 46 is disposed within the housing 14 radially inboard of the outer wall 60 of the housing 14. The stator 46 is in an axially-spaced relationship with the bearing shield 22 of the housing 14, in various implementations.

Referring still to FIGS. 4 and 5, a stator carrier 66 is operably coupled with the stator 46. In some embodiments, the stator 46 can be coupled to an inner surface of the stator carrier 66 via a shrink fit arrangement; however, other methods can be utilized, in various implementations. As illustrated in FIG. 4, the stator carrier 66 includes a first portion 68 that is positioned radially between the stator 46 and the outer wall 60 and extends along the stator 46. As further illustrated in FIG. 4, the stator carrier 66 can include a second portion 70 that extends radially inboard from an end of the first portion 68. As illustrated in FIG. 4, the second portion 70 extends radially inboard from the first portion 68 to a radially inboard terminus 72 of the second portion 70 of the stator carrier 66. The radially inboard terminus 72 is the radially inboard-most portion of the second portion 70 of the stator carrier 66. In the embodiment illustrated in FIG. 4, the radially inboard terminus 72 of the second portion 70 of the stator carrier 66 is positioned radially inboard of the stator 46.

Referring still to FIGS. 4 and 5, the stator carrier 66 and the housing 14 define a fluid jacket 74. The fluid jacket 74 is configured to convey fluid for removal of heat from the electric drive unit 10. In various embodiments, the fluid jacket 74 is a portion of a fluid circuit through which fluid is cyclically circulated. The fluid within the fluid jacket 74 may comprise water, in various implementations. For example, in an exemplary embodiment, the fluid within the fluid jacket 74 is a water-glycol mixture; however, other fluids may be utilized in various implementations. The fluid that flows within the fluid jacket 74 may be configured to cool various components of the electric drive unit 10 and/or other fluids utilized in the electric drive unit 10, as described further herein. As illustrated in FIG. 4, the fluid jacket 74 includes a first region 76 that is defined radially between the outer wall 60 of the housing 14 and the first portion 68 of the stator carrier 66, and a second region 78 that is positioned axially between the second portion 70 of the stator carrier 66 and the first side 24 of the bearing shield 22.

Figure 6:
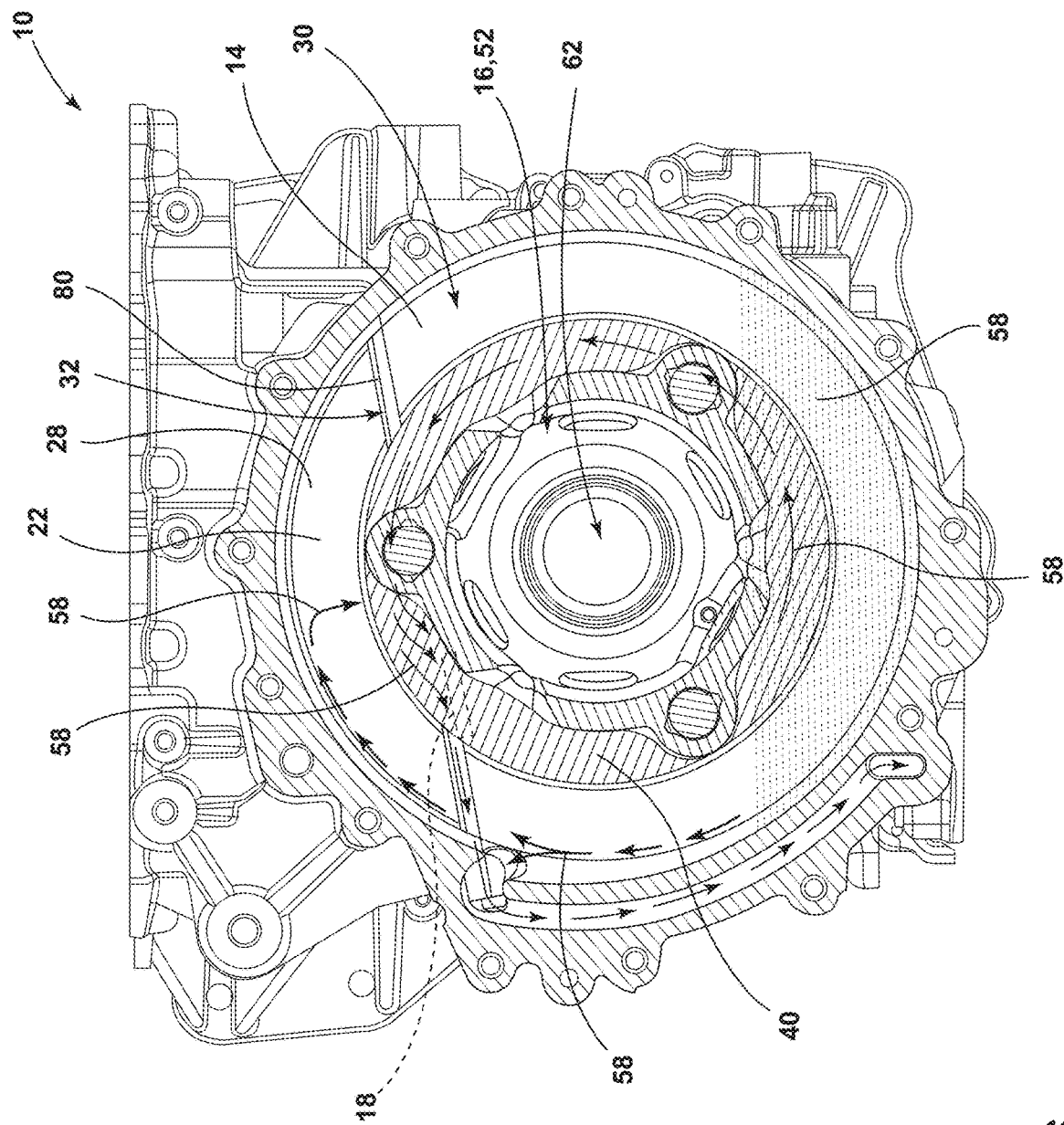
FIG. 6 is a cross-sectional view of a portion of the electric drive unit, illustrating fluid flow paths for fluid disposed within a gearbox region of the housing of the electric drive unit, according to one embodiment.

Referring now to FIGS. 4-6, the transmission of the electric drive unit 10 can include the gearset 52. In various implementations, the electric drive unit 10 includes the planetary gearset 16. The planetary gearset 16 includes the sun gear 34 and a plurality of planet gears 38 that interface with the sun gear 34. The sun gear 34 is operably coupled to the rotor shaft 20, as illustrated in FIGS. 4 and 5, such that the sun gear 34 and the rotor shaft 20 are configured to rotate together at a common rate of rotation about the axis 36. In operation of the electric drive unit 10, the motor 12 drives rotation of the rotor shaft 20 about the axis 36, and the plurality of planet gears 38 revolve about the axis 36 due to the geared interface between the planet gears 38 and the sun gear 34 of the planetary gearset 16. The planetary gearset 16 further includes the carrier 40. The carrier 40 is operably coupled with the plurality of planet gears 38, such that revolution of the planet gears 38 rotates the carrier 40 about the axis 36. In various implementations, the carrier 40 serves to prompt rotation of portions of the differential 54 of the electric drive unit 10. As illustrated in FIG. 4, the gearset 52 is disposed within the gearbox region 30 of the housing 14. In various implementations, the gearset 52 and/or the differential 54 may splash fluid 58, such as oil, onto various portions of the housing 14 that defines the gearbox region 30, such as the second side 28 of the bearing shield 22, as described further herein.

Referring still to FIGS. 4-6, the housing 14 of the electric drive unit 10 includes the channel 32. The channel 32 extends along the second side 28 of the bearing shield 22 of the housing 14. In some implementations, the channel 32 is formed wholly by the housing 14. In other words, the structure that defines the channel 32 is a portion of the housing 14. In some embodiments, the second side 28 of the bearing shield 22 includes a cleft 80 that at least partially forms the channel 32. For example, as illustrated in FIGS. 5 and 6, the second side 28 of the bearing shield 22 includes the cleft 80 that at least partially forms the channel 32. As illustrated in FIG. 5, the cleft 80 in the second side 28 of the bearing shield 22 leads to a generally cylindrical hollow within the bearing shield 22 that forms the channel 32 along with the cleft 80. A variety of types of channels 32 are contemplated, however. For example, in some implementations, the channel 32 may be formed by a protrusion that extends outward from adjacent portions of the second side 28 of the bearing shield 22, such that a channel 32 is formed by the crease between the protrusion and the adjacent second side 28 of the bearing shield 22.

Referring still to FIGS. 4-6, in various implementations, the channel 32 extending along the second side 28 of the bearing shield 22 is disposed wholly elevationally upward of the axis 36 about which the rotor shaft 20 rotates. For example, in the embodiment illustrated in FIG. 6, the cleft 80 that at least partially forms the channel 32 is disposed wholly elevationally upward of the axis 36 and extends across a portion of the second side 28 of the bearing shield 22 at an angle. The channel 32 being angled in this manner may allow for gravity to encourage the flow of fluid 58 within the channel 32 downward along the channel 32 so that the fluid 58 can flow within a broader fluid flow path of the electric drive unit 10, as desired.

In some embodiments, the stator carrier 66 cooperates with the first side 24 of the bearing shield 22 to define the fluid jacket 74, and the fluid jacket 74 is radially and circumferentially aligned with at least a portion of the channel 32, such that heat is transferred from fluid 58 within the channel 32 into the fluid jacket 74 through the bearing shield 22. For example, as illustrated in FIG. 5, the second region 78 of the fluid jacket 74 that is disposed axially between the first side 24 of the bearing shield 22 and the second portion 70 of the stator carrier 66 is radially and circumferentially aligned with at least a portion of the channel 32 that extends along the second side 28 of the bearing shield 22, as illustrated. In this arrangement, the heat from the fluid 58 within the channel 32 is transferred into the fluid within the fluid jacket 74 through the bearing shield 22 to cool the fluid 58 flowing within the channel 32. In various implementations, the fluid 58 within the channel 32 is oil and the fluid within the fluid jacket 74 contains water. As such, heat is transferred from the oil to the water through the bearing shield 22.

As illustrated in FIG. 6, in various implementations, the planetary gearset 16 splashes fluid 58 that is within the gearbox region 30 of the housing 14 onto the second side 28 of the bearing shield 22 above the channel 32, as illustrated in FIG. 6. The fluid 58 that is splashed onto the second side 28 of the bearing shield 22 above the channel 32 is then drawn downward by gravity along the second side 28 of the bearing shield 22 and into the channel 32, as shown. Fluid 58 is then operable to flow along the channel 32 and throughout the fluid flow path of the electric drive unit 10.

Referring now to FIGS. 4-6, the electric drive unit 10 can include the wiper 18. The wiper 18 is coupled to the housing 14 and is configured to wipe fluid 58 off of the carrier 40 as the carrier 40 rotates during operation of the electric drive unit 10. As illustrated in FIG. 6, the gearbox region 30 of the housing 14 acts as a reservoir for fluid 58 (e.g., oil) that is held therein at a level within which a lower portion of the carrier 40 is submerged. As such, as the carrier 40 rotates, the fluid 58 adheres to the surface of the carrier 40. The wiper 18 contacts the carrier 40 and wipes the fluid 58 off of the carrier 40 as the carrier 40 rotates. In some implementations, the wiper 18 is formed of a resilient material, such as a flexible polymer material. The resilient material allows the wiper 18 to be pressed against a surface of the carrier 40 to ensure that consistent contact between the carrier 40 and the wiper 18 is maintained as the carrier 40 rotates.

Referring still to FIGS. 4-6, in various implementations, the wiper 18 is coupled to the housing 14 proximate to the channel 32 and is configured to abut the carrier 40, such that fluid 58 is wiped off of the carrier 40 by the wiper 18 as the carrier 40 rotates, and the fluid 58 flows to the channel 32 therefrom. In various implementations, the wiper 18 is coupled to the bearing shield 22 of the housing 14 proximate to the channel 32. For example, as illustrated in FIG. 5, the wiper 18 is coupled to the second side 28 of the bearing shield 22 proximate the channel 32, such that fluid 58 that the wiper 18 wipes off the carrier 40 flows into the channel 32 as the carrier 40 rotates.

In operation of an exemplary embodiment of the electric drive unit 10, the motor 12 drives rotation of the rotor shaft 20 which drives the planetary gearset 16, such that the sun gear 34 rotates, the planet gears 38 revolve, and the carrier 40 rotates about the axis 36. As this occurs, the planetary gearset 16 splashes fluid 58 along various interior surfaces of the portion of the housing 14 that defines the gearbox region 30, including the second side 28 of the bearing shield 22 above the channel 32 that extends along the second side 28 of the bearing shield 22. Further, fluid 58 adheres to the carrier 40 as the carrier 40 rotates through the fluid 58 that is pooled within the gearbox region 30. The fluid 58 that is splashed above the channel 32 by the planetary gearset 16 is drawn downward along the second side 28 of the bearing shield 22 by gravity and flows into the channel 32. Further, the fluid 58 disposed on the carrier 40 is wiped off of the carrier 40 and into the channel 32 by the wiper 18 as the carrier 40 rotates, as illustrated in FIG. 6. In this way, fluid 58 is directed into the channel 32 where it can be cooled via heat transfer through the bearing shield 22 and into the fluid within the fluid jacket before being conveyed throughout the broader fluid flow path of the electric drive unit 10.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 electric drive unit
12 motor
14 housing
16 planetary gearset
18 wiper
20 rotor shaft
22 bearing shield
24 first side
26 motor housing region
28 second side
30 gearbox region
32 channel
34 sun gear
36 axis
38 planet gears
40 carrier
42 vehicle
44 electric axle assembly
46 stator
48 rotor
50 wheel
52 gearset
54 differential
56 half shafts
58 fluid
60 outer wall
62 central aperture
64 bearing
66 stator carrier
68 first portion
70 second portion
72 terminus
74 fluid jacket
76 first region
78 second region
80 cleft

What is claimed is:
1. An electric drive unit, comprising:
a motor that drives rotation of a rotor shaft;
a housing that includes a bearing shield that extends between a motor housing region that houses the motor and a gearbox region, the bearing shield having a first side that faces toward the motor housing region and a second side opposite the first side that partially defines the gearbox region and along which a channel extends;

a planetary gearset disposed within the gearbox region and including a sun gear operably coupled with the rotor shaft such that the sun gear and the rotor shaft are configured to rotate together at a common rate of rotation about an axis, a plurality of planet gears that interface with the sun gear and are configured to revolve around the axis, and a carrier that is operably coupled with the plurality of planet gears, such that revolution of the planet gears rotates the carrier about the axis; and a wiper coupled to the housing proximate to the channel and configured to abut the carrier, such that fluid is wiped off of the carrier by the wiper as the carrier rotates and flows to the channel therefrom.

2. The electric drive unit of claim 1, wherein the channel is formed wholly by the housing.

3. The electric drive unit of claim 1, wherein the second side of the bearing shield includes a cleft that at least partially forms the channel.

4. The electric drive unit of claim 3, wherein the cleft is wholly elevationally upward of the axis.

5. The electric drive unit of claim 1, further comprising:
a stator carrier that cooperates with the first side of the bearing shield to define a fluid jacket, wherein the fluid jacket is radially and circumferentially aligned with at least a portion of the channel, such that heat is transferred from the fluid within the channel into the fluid jacket through the bearing shield.

6. The electric drive unit of claim 5, wherein the fluid within the channel is oil, and the fluid jacket contains water, and wherein heat is transferred from the oil to the water through the bearing shield.

7. The electric drive unit of claim 1, wherein the wiper is formed of a resilient material.

8. An electric drive unit, comprising:
a motor that drives rotation of a rotor shaft;
a housing that includes a bearing shield that extends between a motor housing region that houses the motor and a gearbox region, the bearing shield having a first side that faces toward the motor housing region and a second side opposite the first side that partially defines the gearbox region and along which a channel extends; and
a gearset disposed within the gearbox region and operably coupled with the rotor shaft, such that rotation of the rotor shaft causes the gearset to splash fluid that is within the gearbox region onto the second side of the bearing shield above the channel, wherein gravity draws the fluid downward along the second side of the bearing shield and into the channel.

9. The electric drive unit of claim 8, wherein the second side of the bearing shield includes a cleft that at least partially forms the channel.

10. The electric drive unit of claim 9, wherein the cleft is wholly elevationally upward of an axis about which the rotor shaft rotates.

11. The electric drive unit of claim 8, wherein the gearset is a planetary gearset that includes a carrier.

12. The electric drive unit of claim 11, further comprising:
a wiper coupled to the housing and configured to wipe fluid off of the carrier as the carrier rotates.

13. The electric drive unit of claim 12, wherein the wiper is coupled to the second side of the bearing shield proximate the channel, such that the fluid that the wiper wipes off of the carrier flows into the channel.

14. The electric drive unit of claim 12, wherein the wiper is formed of a resilient material.

15. The electric drive unit of claim 8, further comprising:
A stator carrier that cooperates with the first side of the bearing shield to define a fluid jacket, wherein the fluid jacket is radially and circumferentially aligned with at least a portion of the channel with respect to an axis about which the rotor shaft rotates, such that heat is transferred from the fluid within the channel into the fluid jacket through the bearing shield.

16. The electric drive unit of claim 15, wherein the fluid within the channel is oil, and the fluid jacket contains water, and wherein heat is transferred from the oil to the water through the bearing shield.

17. An electric drive unit, comprising:
a motor that drives rotation of a rotor shaft;
a planetary gearset operably coupled with the rotor shaft and having a carrier;
a housing that houses the motor and planetary gearset; and
a wiper coupled to the housing and configured to wipe fluid off of the carrier as the carrier rotates.

18. The electric drive unit of claim 17, wherein the wiper is formed of a resilient material.

19. The electric drive unit of claim 17, wherein the housing includes a bearing shield that extends between the motor and the planetary gearset and includes a channel that is configured to receive fluid wiped off of the carrier by the wiper.

20. The electric drive unit of claim 19, wherein the channel is a cleft in the bearing shield that is positioned wholly elevationally upward of an axis about which the rotor shaft rotates.

* * * * *